United States Patent [19]

Daenen

[11] 4,091,953
[45] May 30, 1978

[54] MULTI-PURPOSE BOWL SET

[75] Inventor: Robert H. C. M. Daenen, Aalst, Belgium

[73] Assignee: Dart Industries Inc., Los Angeles, Calif.

[21] Appl. No.: 612,155

[22] Filed: Sept. 10, 1975

[51] Int. Cl.² .............................................. B65D 21/02
[52] U.S. Cl. .................... 220/23.86; 220/405; 220/23.6; 220/23; 220/212; 220/355; 206/514
[58] Field of Search ................. 220/23.83, 23.86, 23.6, 220/17, 212, 355, 23; 206/501, 514

[56] References Cited

U.S. PATENT DOCUMENTS

| | | | |
|---|---|---|---|
| 197,595 | 11/1877 | Brown | 220/23 |
| 1,038,098 | 9/1912 | Decker | 220/17 |
| 1,134,427 | 4/1915 | Ullrich | 220/212 |
| 1,696,004 | 12/1928 | Jackson | 220/23.6 |
| 2,237,293 | 4/1941 | Dukehart, Jr. | 220/23 |
| 3,070,275 | 12/1962 | Bostrom | 220/17 |
| 3,113,667 | 10/1963 | Knapp et al. | 206/502 |
| 3,349,941 | 10/1967 | Wanderer | 206/514 |
| 3,446,391 | 5/1969 | Yates, Jr. | 220/355 |
| 3,537,610 | 11/1970 | Bilon | 220/23 |

FOREIGN PATENT DOCUMENTS

| | | | |
|---|---|---|---|
| 798,818 | 5/1936 | France | 220/17 |
| 978,565 | 12/1964 | United Kingdom | 220/23.83 |

Primary Examiner—William Price
Assistant Examiner—Joseph M. Moy

[57] ABSTRACT

A stackable bowl and closure combination including two bowl shaped members one of which is substantially larger, i.e. deeper than the other and wherein the shallower of same is adapted to closure the larger in either an upright or inverted position. When the shallower bowl is positioned upon the larger one in an upright position, both bowls may be employed to store foodstuffs, whereas when the former is inverted only the larger bowl will function in a storage sense but the capacity thereof is substantially increased. Furthermore, the smaller of the bowls may be closured and sealed for storage purposes by a generally planar seal employing a peripherally extending U-shaped sealing groove. Likewise, the combined bowls may be used as serving dishes subsequent there separation one from the other.

1 Claim, 5 Drawing Figures

MULTI-PURPOSE BOWL SET

This invention relates to a bowl arrangement for storing and serving various food products and, more particularly, to a two bowl combination wherein one bowl is used to closure the other.

Although a variety of prior art containers having stacked closuring features are known, it is usual that such be of similar or identical size. Furthermore, normally containers of this type are closurable only in one position, that being in an upright fashion. Accordingly, even though storage space and the number of component parts, i.e. closures may be reduced, such are not particularly versatile in their design and construction. Likewise, these prior art devices normally effect closuring by providing a shallow undercut around the periphery of each container base. Thus, the degree of sealing is minimal and the stability of a stacked container group is tenuous.

In many instances, especially in the storage of food, it is desirable to minimize the space requirments of the storing container or containers. In this context, these bowls are constructed so that the smaller of the two is stackable within the larger and in such stacked relationship the smaller acts as a closure for the larger. Likewise, the smaller, when used in this fashion, may be sealed with a planar type closure having a U-shaped sealing groove extending around the periphery thereof, such groove being adapted to mate with the rim of the smaller container.

Thus, in those instances where it is desirable to serve separate but compatible food dishes, for example, where one is a garniture for the other, the larger container of this bowl arrangement could hold the principal dish while the smaller bowl would be suitable for storage of the garniture.

Note also, however, that the smaller bowl here may be inverted and used solely as a closure for the larger bowl. Therefore, if the volume of food to be stored in the larger bowl dictates, the smaller bowl may be inverted to accommodate same. The arrangement is also adaptable for use as dual serving plates. Thus, portions contained in each may be split, half contained in each being deposited in the other, such thereafter being used by two parties as plates from which to eat. Accordingly, there is here provided a bowl combination having unique interrelating aspects that significantly extend the potential functionality thereof.

In addition to those mentioned above, other advantages of this bowl arrangement will become more apparent upon continuing reference to the specification, claims and drawings wherein:

Figure 1:
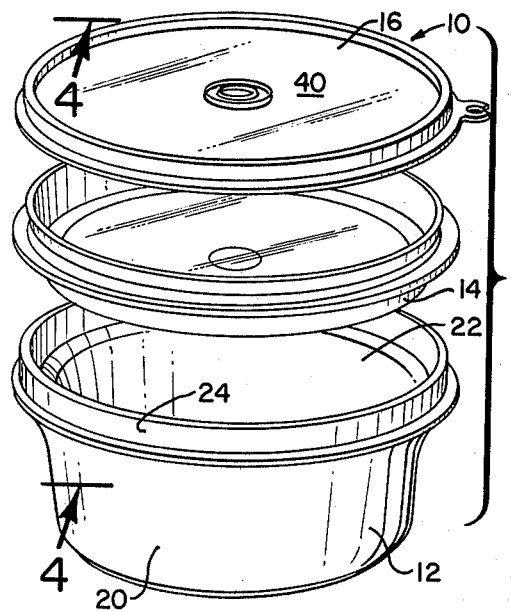
FIG. 1 is an exploded top perspective view of the stacking bowl combination.
Figure 2:
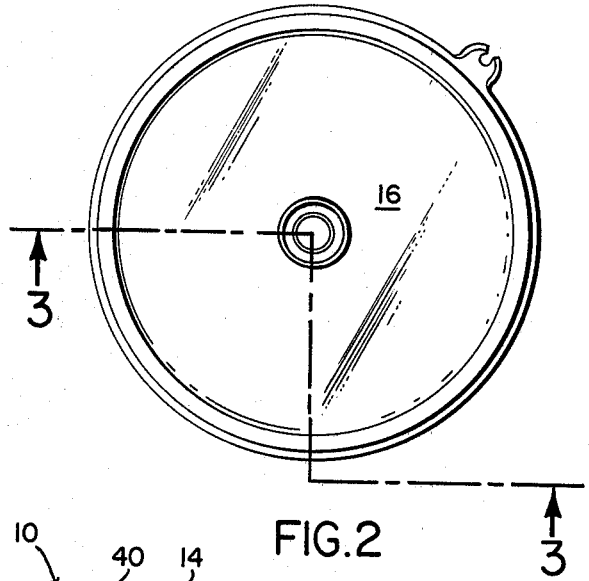
FIG. 2 is an assembled top plan view of bowls shown in FIG. 1.
Figure 3:
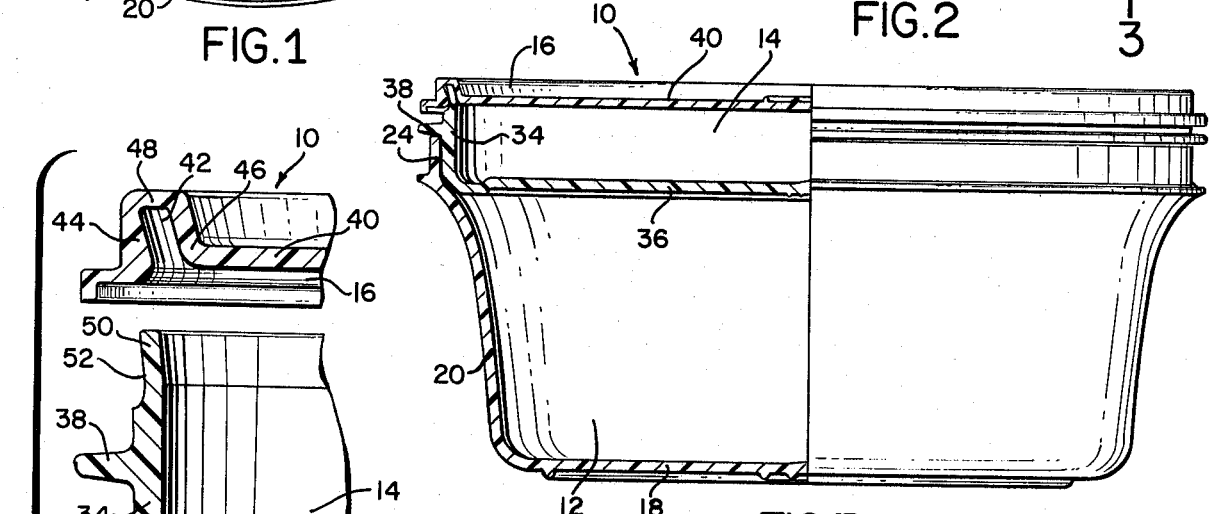
FIG. 3 is a partially sectioned side elevational view of the assembled bowls of FIG. 1 taken along line 3—3 of FIG. 2.
Figure 4:
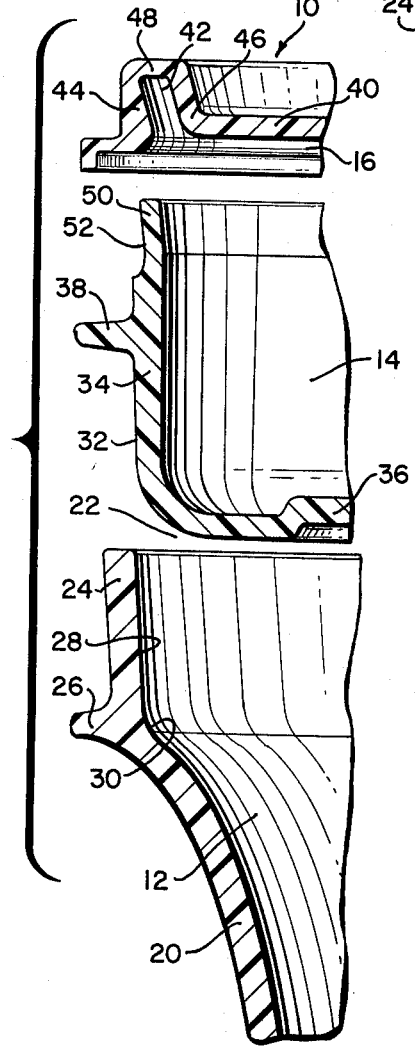
FIG. 4 is an exploded and enlarged partial cross section taken along line 4—4 of FIG. 1 of this bowl arrangement illustrating one preferred form thereof that is adapted for the storage of foods; and, FIG. 5 is a partial cross section of a side elevation of the two bowl combination illustrating another closuring technique for same.

This combined bowl arrangement 10 includes as its component parts a first bowl member 12, a second smaller bowl member 14 and a substantially planar closure member 16. As is apparent from FIGS. 1, 3 and 4, these elemental parts can be assembled as shown in FIG. 3 to create two separate and distinct closured storage compartments. One such compartment, of course, is generated by the first bowl member 12 which is closured by the second smaller bowl 14. Similarly, the closure member 16 seals the second compartmental area, that formed by the interior of bowl 14.

The bowl member 12 includes a base wall 18 and an integral upwardly extending sidewall structure 20 that terminates at the open end 22 in a substantially vertical peripheral rim 24. The rim 24 does, however, incorporate a slight outward flare, the purpose for which will be made apparent hereinbelow. Note also that proximate the point of initiation of the rim 24 the sidewall 20 takes a distinctly interiorally disposed convex curvature. Such curvature continues for a short distance outwardly of the rim thus producing the protruding ledge 26 that extends all around the bowl or container 12. Together the ledge 26 and wall curvature provide a convenient handle means for the container.

As is indicated hereinabove, the rim 24 (FIG. 4) flares slightly outwardly and the interior surface 28 thereof includes a fillet radius 30 at its lower extremity. This surface 28 and fillet 30 are adapted to mate with portions of the exterior surface 32 of bowl 14. The surface 32 is produced by sidewall 34 which along with bottom wall 36 forms the second smaller bowl 14. This bowl or container also includes a generally horizontally projecting lip 38 proximate the midpoint of sidewall 34.

The second more shallow bowl 14 is of a size and shape corresponding to the interior surface 28 of bowl 12. Accordingly, bowl 14 will nest within bowl 12 in the manner shown in FIG. 3. This effectively closures the bowl 12 due to the close association of surfaces 32 and 28, and the abutment of lip 38 upon the upper edge of rim 24.

Furthermore, the container 14 may also be sealed by closure member 16, thus protecting the contents placed therein. The closure 16 includes a substantially planar center wall portion 40 and a peripherally extending generally U-shaped groove 42, the groove being formed by a pair of upstanding walls 44, 46 and interconnecting top wall 48. The noted U-shaped groove 42 is, of course, adapted for placement over the upper edge 50 of gowl sidewall 34. Edge 50 is also slightly flared and undercut at 52 on its outer surface to accommodate the closure 16.

Figure 5:
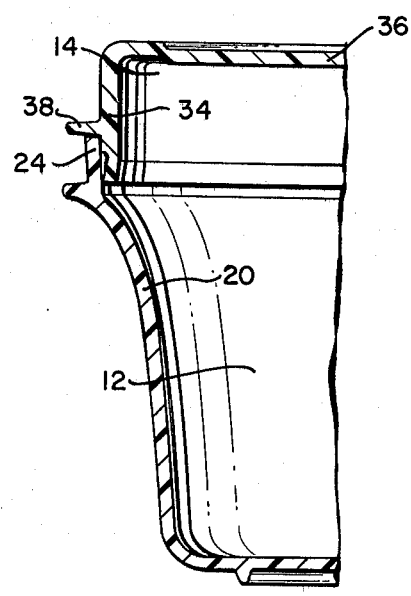

The undercut area 52, however, also provides a slight relief that is necessary to make the bowl 14 effective as a reversible closure, FIG. 5. There it can be seen that in the event additional storage volume is required for bowl 12, the bowl 14 may be inverted and placed thereupon to create a domed, yet still effective closure. In this instance the opposite side of lip 38 engages the upper edge of rim 24 and the upper edge 50 of bowl 14 projects into bowl 12 along interior surface 28.

Also note that regardless of how the bowls 12 and 14 are employed for storage and sealing such may be used individually as serving plates if so desired. It should also be apparent that even though the preferred embodiment as shown illustrates circular container such might be of any other desired shape without affecting the functionality of the arrangement.

I claim:

1. A combined bowl arrangement and including: a first bowl member having upstanding sidewall portions that terminate in a peripherally extending rim having an inner wall that, although slightly flared, is of a substantially vertical disposition; a removable second bowl member of a planar size and shape corresponding to that defined by the inner wall of the rim of said first bowl member and having substantially vertically disposed walls, the exterior surfaces of, which are segmented by a substantially horizontally extending peripheral lip, said lip being intermediately positioned along the walls of said second bowl at a point such that the second bowl will nest within said first bowl in either the upright or inverted position, said lip engaging the upper terminal edge of said rim; and a substantially planar closure having a generally U-shaped sealing groove adjacent the periphery thereof, said groove engaging the terminal edge of the walls of said second bowl while said second bowl is in the upright position only.

* * * * *